United States Patent
Gervasi et al.

(10) Patent No.: US 6,623,687 B1
(45) Date of Patent: Sep. 23, 2003

(54) PROCESS OF MAKING A THREE-DIMENSIONAL OBJECT

(75) Inventors: Vito R. Gervasi, New Berlin, WI (US); Robert S. Crockett, Shell Beach, CA (US)

(73) Assignee: Milwaukee School of Engineering, Milwaukee, WI (US)

( * ) Notice: Subject to any disclaimer, the term of this patent is extended or adjusted under 35 U.S.C. 154(b) by 0 days.

(21) Appl. No.: 09/633,314

(22) Filed: Aug. 7, 2000

Related U.S. Application Data
(60) Provisional application No. 60/147,691, filed on Aug. 6, 1999.

(51) Int. Cl.$^7$ .......................... B29C 35/08; B29C 41/02; G06F 17/50; G06F 19/00
(52) U.S. Cl. ...................... 264/401; 264/308; 700/119; 700/120
(58) Field of Search ................... 264/303, 401; 700/119, 120

(56) References Cited

U.S. PATENT DOCUMENTS

| | | |
|---|---|---|
| 4,844,144 A | 7/1989 | Murphy et al. |
| 5,109,589 A | 5/1992 | Cramer et al. |
| 5,256,340 A | 10/1993 | Allison et al. |
| 5,418,112 A | 5/1995 | Mirle et al. |
| 5,439,622 A | 8/1995 | Pennisi et al. |
| 5,482,659 A | 1/1996 | Sauerhoefer |
| 5,735,336 A | 4/1998 | Oti |
| 5,775,402 A | 7/1998 | Sachs et al. |
| 5,824,260 A | 10/1998 | Sauerhoefer |
| 6,193,923 B1 * | 2/2001 | Leyden et al. ............... 264/401 |

FOREIGN PATENT DOCUMENTS

| | | |
|---|---|---|
| EP | 0 484 183 A1 | 5/1992 |
| EP | 0 590 597 A2 | 4/1994 |
| EP | 0 649 691 A1 | 4/1995 |

OTHER PUBLICATIONS

Vito R. Gervasi, Lisa M. Milkowski, James V. Canino and Rebecca J. Zick, MSOE TetraLattice, Applications and Simplified CAD Representations, Rapid Prototyping Center, Milwaukee School of Engineering, Milwaukee, Wisconsin.

Vito R. Gervsi, Dr. Daniel A. Brandt, Steven D. Shaffer and King Lim, Tetracast* SLA Build Style, The 7th International Conference on Rapid Prototyping, Aug. 1, 1997.

Vito R. Gervasi, Net Shape Composites Using SLA Tetracast* Patterns, Rapid Prototyping Center, Milwaukee School of Engineering, 08–97.

Don Klosterman, Richard Chartoff, Nora Osborne, George Graves, Allan Lightman, Gyoowan Han, Laminated Object Manufacturing (LOM) of Advanced Ceramics and Composites, Aug. 1, 1997, pp. 43–50.

Don Klosterman, Brian Priore and Richard Chartoff, Laminated Object Manufacturing of Polymer Matrix Composites, Aug. 1, 1997, pp. 283–292, Ohio Rapid Prototyping Process Development Consortium, Dayton Ohio.

Fiber/Resin Composite Manufacturing Using Stereolithography, Rapid Prototyping Report, 08–92, pp. 5–6, Volume 2, Number 8, CAD/CAM Publishing, Inc.

Amit Bagchi and Robert Beesley, Multi–Layered Composites Using Photolithography, Solid Freeform Fabrication Symposium Proceedings, 1994, pp. 234–241.

R. Charan and A. Bagchi, Fabrication of Composite Prototypes by 3–D Photolithography, The 4th International Conference on Rapid Prototyping, 1993, pp. 15–23.

*Primary Examiner*—Leo B. Tentoni
(74) *Attorney, Agent, or Firm*—Michael Best & Friedrich LLP

(57) ABSTRACT

A three dimensional object having a first one-piece build style lattice including a plurality of substantially uniform build style units and a second one-piece build style lattice integrally formed with and interlaced with the first lattice, the second lattice including a plurality of substantially uniform build style units.

20 Claims, 8 Drawing Sheets

OTHER PUBLICATIONS

R. Charan, T. Renault, A.A. Ogale and A. Bagchi, Automated Fiber Reinforced Composite Prototypes, The 4th International Conference on Rapid Prototyping, 1993, pp. 91–97.

A. Safari, S.C. Danforth, R.K. Panda, T.F. McNulty, F. Mohammadi and A. Bandyopadhyay, Fabrication of Piezoelectgric Ceramics and Composites Using Rapid Prototyping Techniques, The 7th International Conference on Rapid Prototyping, Aug. 1, 1997, pp. 34–42.

Raymond Chang, Chemistry, Third Edition, 1988, pp. 422–423, McGraw–Hill Publishing Company.

http://www.webworqs.com/design/nomura/quick.html (Undated).

http://www.protogenic.com/MetalParts.html (Undated).

http://www.protogenic.com/Stereolith.html (Undated).

http://www.msoe.edu/rpc/sla.htm (Undated).

The Selective Laser Sintering Process Third–Generation Desk Top Manufacturing, DTM Corporation, Austin, TX, (undated).

Scott Hill, Selective Laser Sintering: Understanding and Applying the Technology, Oct. 23, 1990, Presented to: The First National Conference on Desktop Manufacturing, Cambridge, MA.

Rapid Prototyping Systems, The Solider Solution for Prototyping and Manufacturing, Jan. 11, 1992, Cubital Ltd.

Preliminary Product Data, Cibatool SL, XB 5170, 3D Systems, Inc. (Undated).

Cibatool SL 5180, 3D Systems, Inc., Ciba–Geigy Corporation, 1994.

SLS Model 125, DTM Corporation, Austin, TX, 1989.

Dr. Paul Jacobs, Stereolithography 1993: Epoxy Resins, Improved Accuracy & Investment Casting, 3D Systems, Inc., Valencia, CA.

Dr. Adrian Schulthess, New Resin Developments for Stereolithography, Rapid Prototyping and Manufacturing Conference '94, Apr. 26, 1994.

William E. Boyes, Low Cost Jigs Fixtures & Gauges for Limited Production, Chapter 10, Plastic Tool Construction, Society of Manufacturing Engineers, pp. 157–183, (undated).

Application Brief, Nylon Material Properties, DTM Corporation, (undated).

Jim Tobin, Chris Schneider, Bob Pennisi and Steve Hunt, Rapid Sterolithography Molds, May 15, 1992, vol. 15, p. 38, Motorola Inc. Technical Developments.

V.R. Gervasi and R.S. Crockett, Composites With Gradient Properties From Solid Freeform Fabrication, Rapid Prototyping Center, Aug. 10, 1998, pp. 729–735, Milwaukee School of Engineering, Solid Freeform Fabrication Symposium.

Eric Fodran, Martin Koch and Unny Menon, Mechanical and Dimensional Characteristics of Fused Deposition Modeling Build Styles, Aug. 12, 1996, pp. 419–442, Solid Freeform Fabrication Symposium.

Richard Hague and Phill Dickens, Finite Element Analysis & Strain Gauging of the Stereolithography/Investment Casting System, Aug. 12, 1996, pp. 523–537, Solid Freeform Fabrication Symposium.

Wenlong Albert Yao, Harmean Wong and Ming C. Leu, Analysis of Thermal Stresses in Investment Casting with Epoxy Patterns, 1996, North American Stereolithography User's Group Conference.

Phidias: Laser Photopolymerisation Models Based on Medical Imaging, a Development Improving the Accuracy of Surgery, 1996, North American Stereolithography User's Group Conference, Materialise NV, Belgium.

Richard Hague and Phill Dickens, Design of New Build Structures for the Successful Autoclaving of Stereolithography Models, 8–97, pp. 192–202, International Conference on Rapid Prototyping.

* cited by examiner

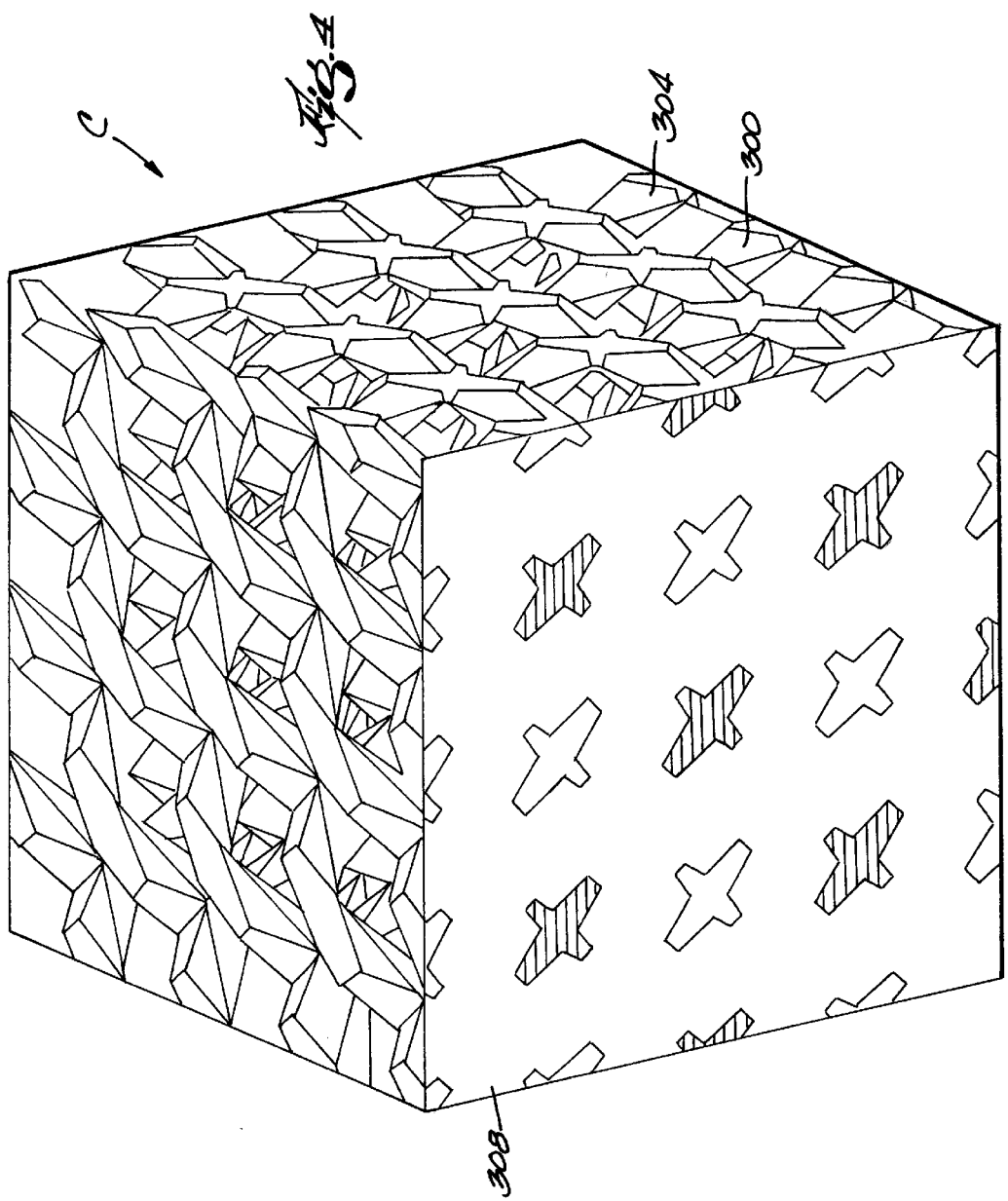

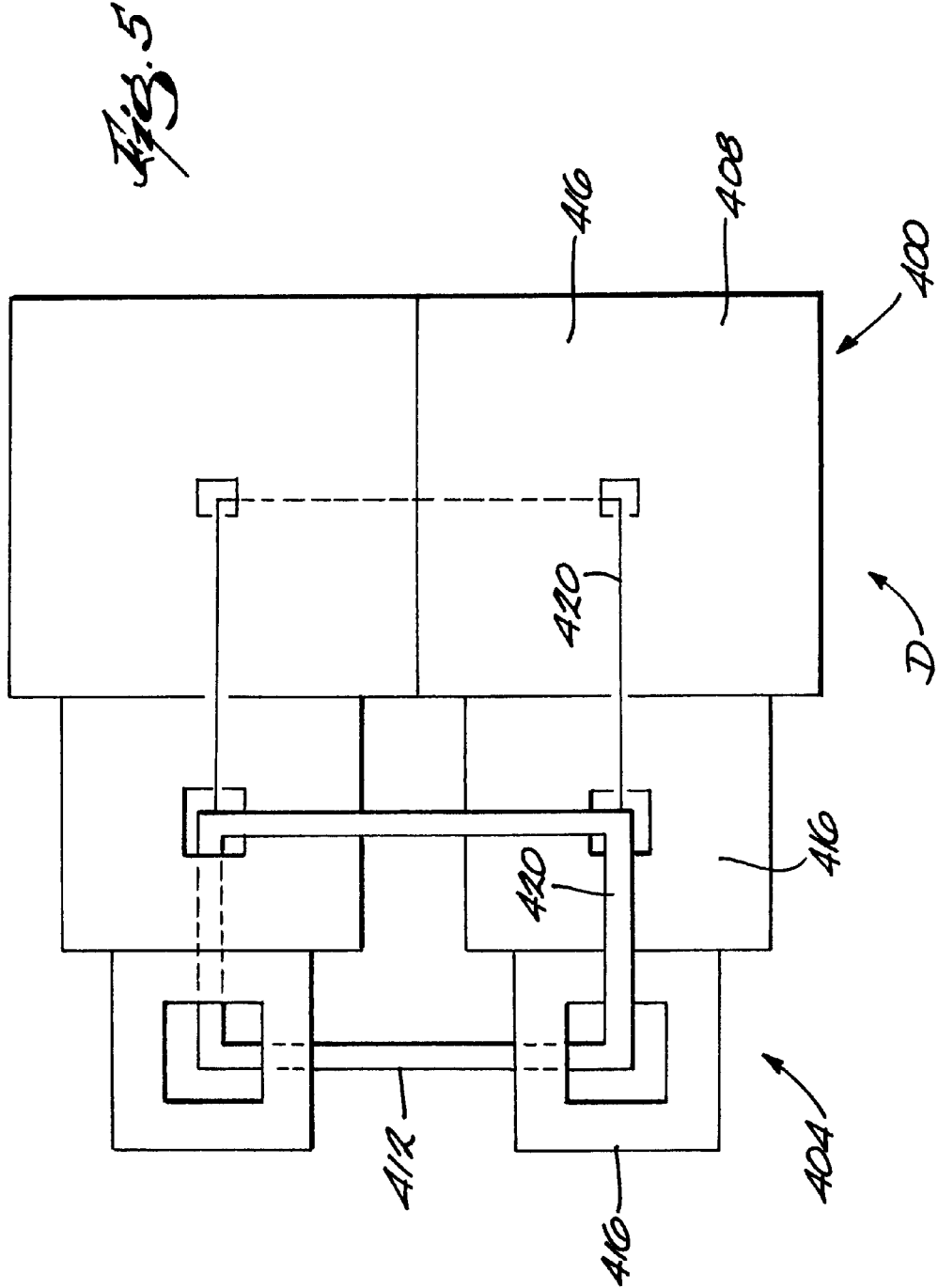

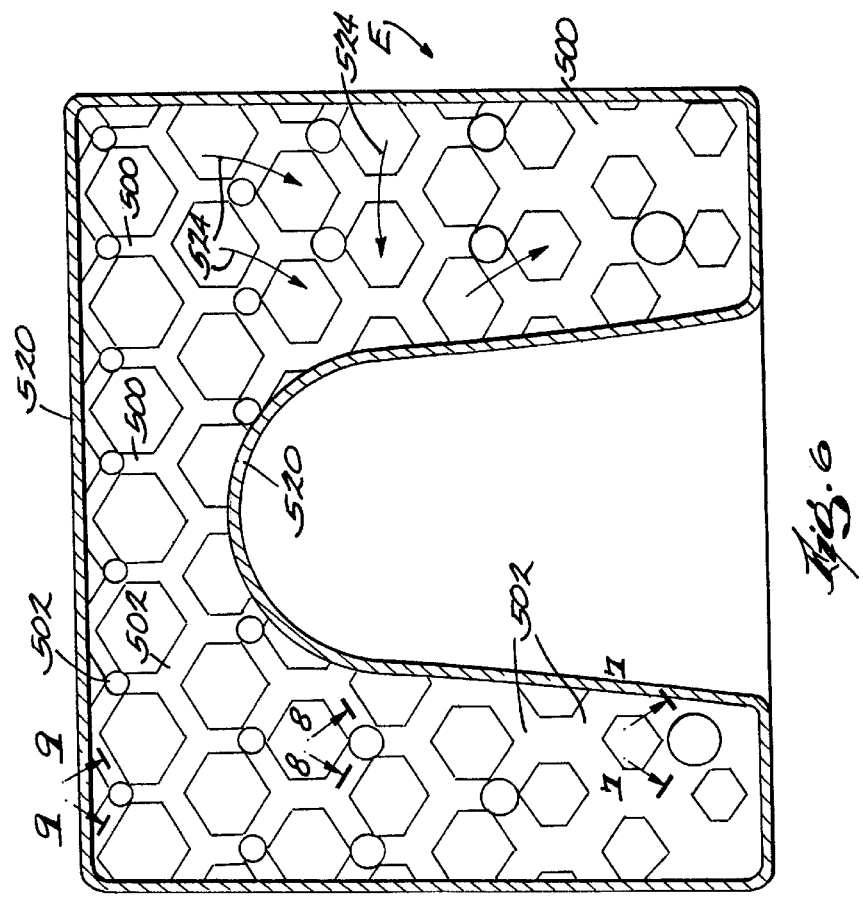
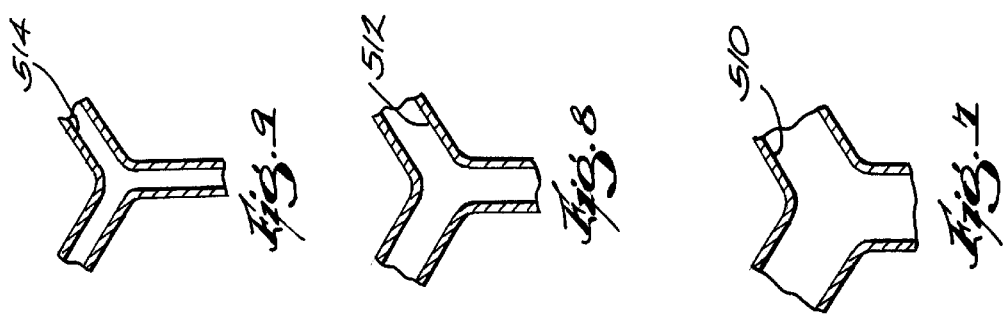

PROCESS OF MAKING A THREE-DIMENSIONAL OBJECT

RELATED APPLICATIONS

This application claims priority to the filing date of provisional application Serial No. 60/147,691 filed Aug. 6, 1999.

TECHNICAL FIELD

The invention relates to techniques for making three dimensional objects, and particularly to solid freeform fabrication techniques and objects made through use of such techniques.

RELATED PRIOR ART

Solid Freeform Fabrication ("SFF") or rapid prototyping techniques are typically useful for quickly making complex or simple three dimensional objects. In general, SFF processes enable rapid and accurate fabrication of three dimensional objects which otherwise could be produced only by lengthy molding and machining processes. SFF techniques are, generally speaking, additive processes whereby the object to be formed is fabricated by reducing a model or representation of the object's ultimate configuration into a series of planar cross-sections and subsequently recompiling the cross-sections to reconstruct the object.

Stereolithography is one of several known SFF techniques. In practicing this process using equipment commonly known as stereolithography apparatus ("SLA"), an ultraviolet laser beam selectively scans a reservoir of a of photosensitive liquid along a predetermined path. Upon the laser beam being exposed to the portions of the liquid lying in the beam's path, the exposed portions of the liquid cure or solidify through polymerization. An example of stereolithographic methods and equipment are disclosed in U.S. Pat. No. 5,256,340, which issued to Allison on Oct. 26, 1993 and which is assigned to 3D Systems, Inc.

Another known SFF process utilizes Cubital's Solider system. In general, this process utilizes a photo-mask which represents the image of the particular layer of the object to be produced. The mask is positioned over a layer of photosensitive liquid. Selective solidification of the layer occurs upon exposure of ultraviolet light through the mask. Unsolidified resin is drained from the partially composed object leaving the desired configuration of surfaces and cavities. The cavities of the object are then filled with a liquid material having a relatively low melting point, such as wax. Upon solidification of the wax, the uppermost layer of the object is made uniform, such as by planing or milling. Then a new layer of the photocurable liquid is positioned on the surface. Another mask is created and the process is repeated. Upon completion of production, the wax is melted and pour from the object to expose the configuration of the object. As discussed below, the object may comprise a plurality of interconnected, internal cavities or may be hollow.

In addition to these specifically described SFF techniques, there are other techniques not described in detail here. Among these techniques are plasma deposition techniques whereby plasma is deposited along a predetermined path and permitted to solidify to build an object on a layer by layer basis. One such additive technique is known as Laser Engineered Net Shaping (LENS™) technology developed by Optomec, Inc., located in Albuquerque, N. Mex. The Optomec Directed Materials Deposition process uses a high power laser focused onto a substrate to melt the substrate surface. Metal powder is then blown into the melt pool to increase its volume. Subsequent scanning of the substrate relative to the laser beam provides a means to deposit thin metal lines on the substrate surface. With the addition of computer control, the Optomec system deposits the metal lines to form patterns on the substrate surface. Finally, this patterning method is coupled with the ability to interpret 3-D CAD designs and allows those patterns to represent a series of slices through the part from the CAD system. Using this method, a component can be fabricated directly from a CAD solid model one layer at a time until the entire object is realized. The result is fully dense metal parts with dimensional accuracy.

Solid Freeform Fabrication technologies depend on the use of computers to generate cross-sectional patterns representing the layers of the object being formed, and generally require the associated use of a computer and computer-aided design and manufacture (CAD/CAM) software. In general, these techniques rely on the provision of a digital representation of the object to be formed. The digital representation of the object is reduced or "sliced" to a series of cross-sectional layers which can be overlaid to form the object as a whole. The SLA or other apparatus for carrying out the fabrication of the object then utilizes the cross-sectional representations of the object for building the object on a layer-by-layer basis by, for example, determining the path of the laser beam in an SLA or the configuration of the mask to be used to selectively expose UV light to photosensitive liquids.

It is also known to form hollow structures wherein just the periphery or boundary skin of the object is formed. However, fabrication of entirely hollow objects sometimes is not acceptable because of limitations in the resultant structure and the photosensitive materials used by SLA. In particular, hollow structures fabricated by utilizing only a boundary skin often suffer from high structural stresses, shrinkage, curl in the materials and other distortions of the object.

It is also known to form the periphery of the object by formation of a substantially intact boundary skin, and to provide an integrally formed lattice located internally within the skin boundary. An example of such a technique or "build style" is the QuickCast™ system by 3D Systems, Inc. which can be used to produce three dimensional objects having a skin and a honeycomb-like internal structure or lattice extending between the boundaries defined by the skin.

The desired internal and external object geometry depends upon the anticipated usage of the object to be formed and is based upon a computer generated model or representation of the object. For example, it may be desirable to produce an object with a hollow portions, solid portions and portions occupied by a lattice work. These "build styles" each have distinct advantages and disadvantages. For example, certain build styles, such as the QuickCast™ build styles can be useful when the resultant object is to be filled with a material to solidify, strengthen or otherwise further process the object. The presence of a lattice build style can often afford more ready introduction of strengthening materials into the object, can provide dimensional stability, dimensional accuracy and functionality, or provide a more accurate model.

SUMMARY OF THE INVENTION

While it is thus generally known to use SFF processes utilizing a single lattice build style to make a three-dimensional object, such techniques and the resultant objects still have significant practical limitations. In particular, the materials used in some SFF techniques, such as photosensitive resins used in an SLA have physical characteristics which limit the usefulness of the resultant object. Among the features of the present invention is the enhancement of known SFF techniques to include multiple build style lattices in both the process of making the object and in the resultant object itself. In one embodiment, the invention provides an object that includes the structure of a first lattice build style which is integrally formed as a single piece. The object also includes a second lattice build style that is also integrally formed in a single piece and that is intertwined or interlaced with the structure of the first build style lattice. The respective structures of the first and second build style lattices are complementary and are sized and shaped to provide a resultant object having advantageous characteristics and utility.

In this regard, the multiple lattice build styles can be made in conjunction with a boundary skin layer to define the object being made. When multiple lattice build styles are constructed according to the present invention, advantageous results can be achieved that are unavailable using known SFF techniques. For example, interlaced lattice build styles can be used to form entirely solid objects as well as objects having solid regions and passages adjacent or extending through the solid regions. Such structures can be made either with or without a boundary skin on the object, and can provide passageways extending in close proximity to the boundary skin. By utilizing interlaced lattice build styles, objects having utility can be formed. For example, heat exchangers, gradient material components, stress relief structures and the like can be formed.

In one embodiment, the invention provides a three dimensional object including a first one-piece build style lattice including a plurality of substantially uniform build style units. The object also includes a second one-piece build style lattice integrally formed with and interlaced with the first lattice, the second lattice including a plurality of substantially uniform build style units. In another embodiment, the invention provides a method for forming a three dimensional object including the steps of: generating a digital representation of the object; generating a digital representation of a first build style lattice having a predetermined, substantially uniform structure; generating a digital representation of a second build style lattice having a structure similar to the first build style lattice; overlaying the respective representations of the object, the first build style lattice and the second build style lattice; intersecting the overlaid representations to generate a digital representation of the object incorporating the first build style lattice and the second build style lattice; and fabricating the digital representation of the object.

In another embodiment, the invention provides a three dimensional object formed through use of a free form fabrication method including the steps of: generating a digital representation of the object including a representation of a surface of the object; generating a digital representation of a first build style lattice having a predetermined, substantially uniform structure; generating a digital representation of a second build style lattice having a structure similar to the first build style lattice; intersecting the overlaid representations to generate a digital representation of the object incorporating the first and second build style lattices; and fabricating the digital representation of the object incorporating the first and second build style lattices to form a boundary skin, a first lattice integrally formed with and extending from the skin and a second lattice interlaced with the first lattice and integrally formed with and extending from the skin.

Other features and advantages of the invention will become apparent to those skilled in the art upon review of the following detailed description, claims and drawings.

DESCRIPTION OF THE DRAWINGS

FIG. 4 illustrates a third three-dimensional object embodying the invention.

FIG. 5 illustrates a fourth three-dimensional object embodying the invention.

FIG. 6 illustrates a fifth three-dimensional object embodying the invention.

FIG. 7 is a cross-sectional view taken along line 7—7 in FIG. 6.

FIG. 8 is a cross-sectional view taken along line 8—8 in FIG. 6.

FIG. 9 is a cross-sectional view taken along line 9—9 in FIG. 6.

Figure 1:
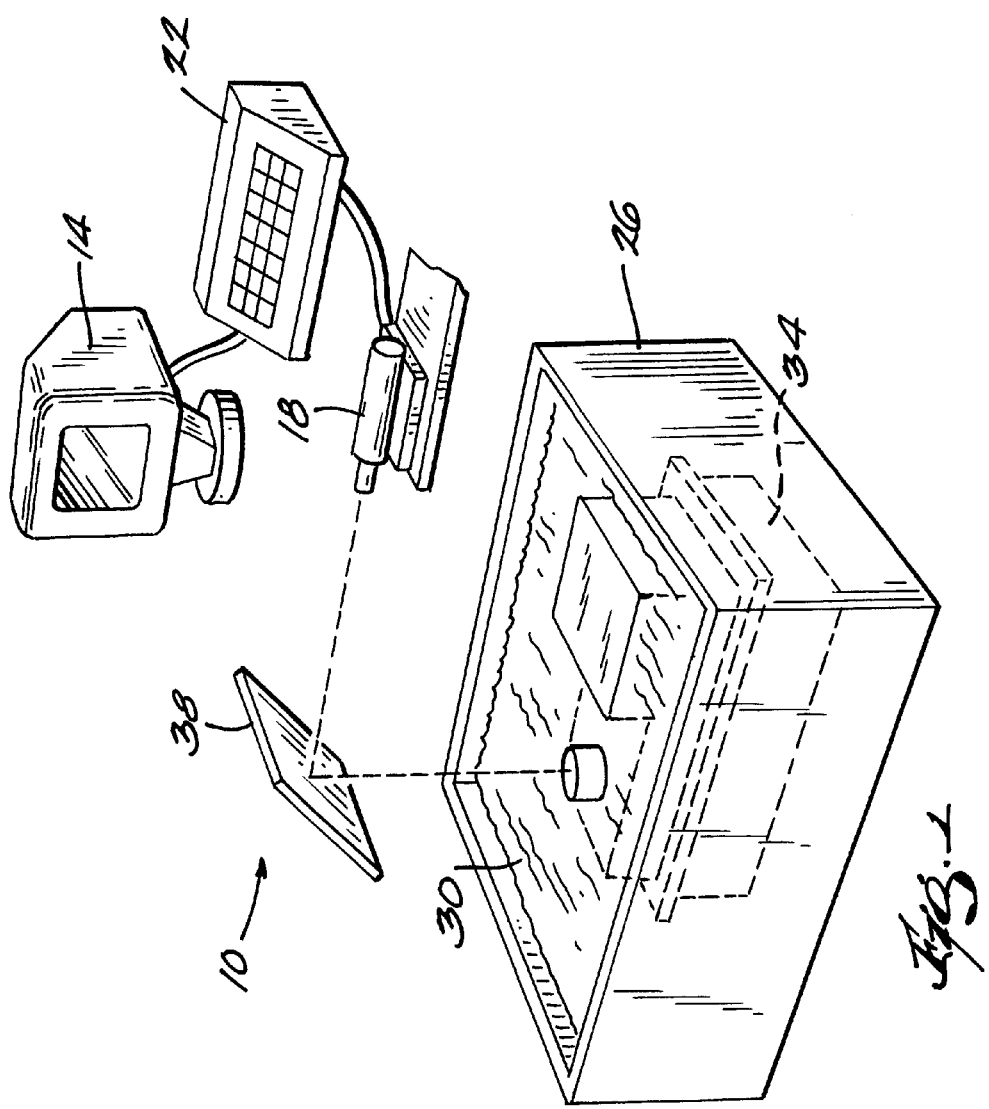
FIG. 1 illustrates an apparatus for carrying out the invention.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE PREFERRED EMBODIMENT

The drawings illustrate apparatus 10 which can be used to carry out the invention and objects embodying the invention. In particular, and with initial reference to FIG. 1, the apparatus 10 is a stereolithography apparatus ("SLA") including a computer 14, a laser beam generator 18 and a control 22 associated with the computer 14 and laser beam generator 18. The apparatus 10 also includes a tank 26 which contains a reservoir 30 of photosensitive liquid. A model support base 34 is located in the tank 26 and can be selectively indexed vertically within the reservoir 30 of liquid by means of an elevator apparatus (not shown). The apparatus 10 also includes a mirror assembly 38 supported in position relative to the laser beam generator 18 to precisely direct a beam produced by the generator 18 into the reservoir 30 of liquid. The mirror assembly 38 also can be selectively repositioned in a precise manner by a mirror control apparatus (not shown) to redirect the beam along a predetermined path along the surface of the liquid reservoir 30. Many suitable SLA are available and can be successfully used for apparatus 10. A preferred SLA is made by 3D Systems, Inc. (Model Nos. SLA-190, SLA-250 and SLA-500). Suitable computers and software applications for use with such SLA include workstations manufactured by Silicon Graphics (Models: Indigo R4000; INDY PC and SC;

Indigo X2, R4000 and R4400) and IRIX software (Release 5.2 or higher). A preferred photosensitive material for use in SFF fabrication of objects for prototyping and casting is an epoxy resin sold under the name Cibatool XB5170 for use with the SLA-190 and SLA-250 models and Cibatool 5180 for use with the SLA-500. A suitable software application for operating the SLA is also provided by 3D Systems, Inc. under the Quickcast™ (QuickCast 1.1 Workstation Software).

Figure 2:
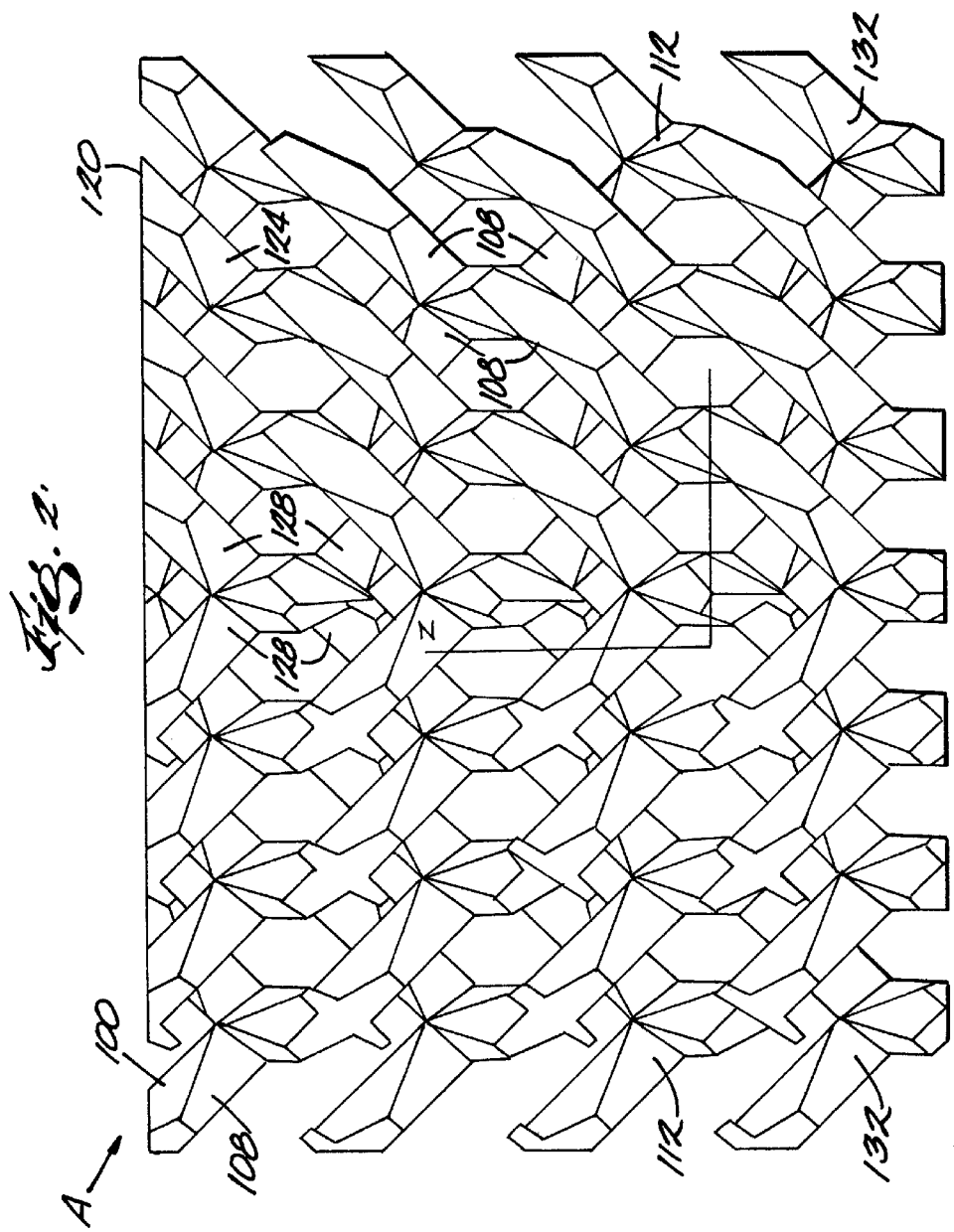
FIG. 2 illustrates a three-dimensional object embodying the invention.

The apparatus 10 can be used to fabricate a variety of three dimensional objects, such as the object A shown in FIG. 2. The object A has a complex configuration and includes a first one-piece lattice build style 100. The first lattice build style 100 includes a plurality of substantially uniform build style units 104. While various configurations of the build style units can be successfully used, in the illustrated embodiment of the first lattice build style each build style unit is in the form of a tetrahedron having four interconnected legs 108 extending from a single node 112. Such a lattice build style 100 is referred to as "tetra lattice", and the structure and methods for producing tetra lattice are set forth in U.S. patent application Ser. No. 09/249,917 filed Feb. 12, 1999 (U.S. Pat. No. 6,309,581) which is incorporated herein by reference in its entirety. The first build style lattice 100 thus includes a plurality of interconnected legs and nodes. In object A illustrated in FIG. 2, the legs 108 and nodes 112 of the first build style lattice 100 have a substantially uniform thickness. However, as explained below and as illustrated in the other figures, the legs and nodes can also be made to vary in any of several aspects.

Object A also includes a second lattice build style 120. The second lattice build style 120 also includes a plurality of substantially uniform build style units 124 which, in the illustrated embodiment, are also tetra lattice tetrahedrons having respective legs 128 and nodes 132. Both the first and second lattices 100, 120 are formed by SFF processes to be one-piece structures. The first and second build styles 100, 120 are arranged relative to each other so that the respective legs 108, 128 and nodes 112, 132 of the tetra lattice units 104, 124 are interlaced. In particular, the first and second build styles 100, 120 are arranged so that the nodes 132 of the second build style lattice 120 are off-set from the nodes 112 of the first lattice build style to a position occupying a space located intermediate the nodes 112 of the first lattice build style 100. When so offset, the lattices 100, 120 are complementary in that the respective nodes 112, 132 are spaced apart and, the axes of the respective legs 108, 128 extending between the nodes 112, 132 are skew to one another. As described below, however, the thicknesses of the legs 108, 128 can be increased to close the spacings between the lattices and to form an object having solid or nearly solid regions.

Figure 3:
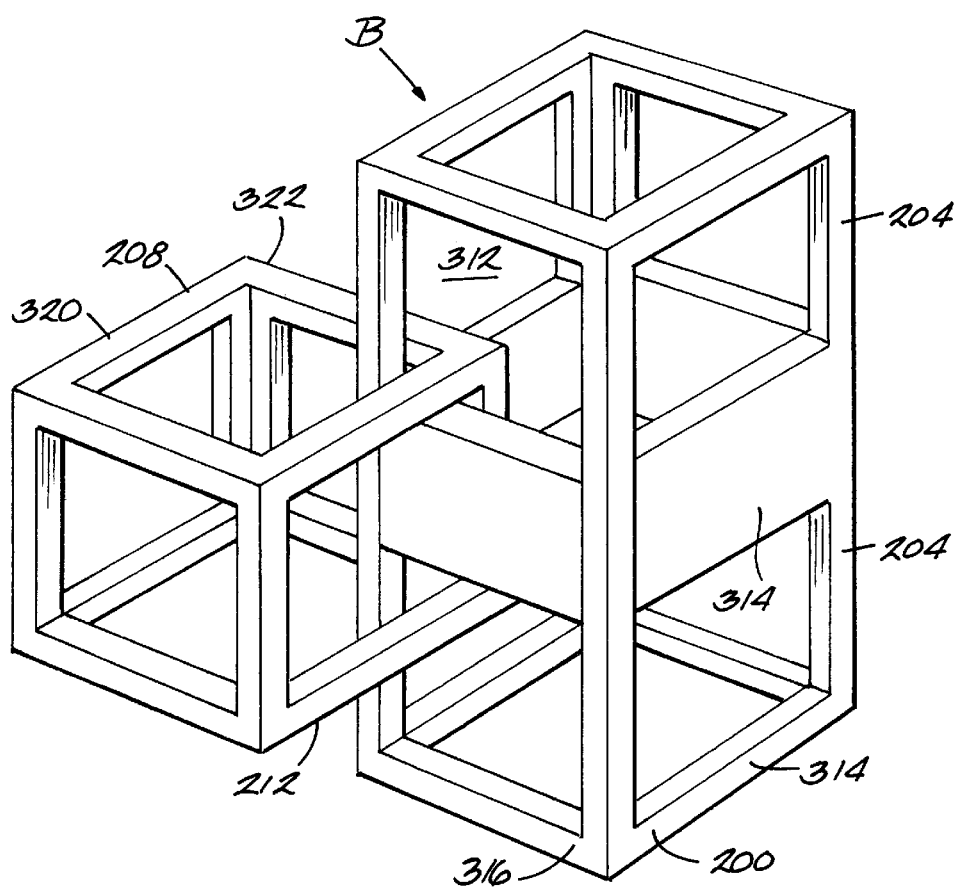
FIG. 3 illustrates a second three-dimensional object embodying the invention.

FIG. 3 illustrates an object B having a first lattice build style 200 including a series of interconnected build style units 204 and a second lattice build style 208 including a build style units 212. The object B has cubital build style units 204, 208 rather than tetra hedron units, but otherwise is structurally similar to object A in that the lattices 200 and 208 are interlaced. Objects A and B illustrate that many possible variations of build style unit configurations can be used successfully to form interlaced lattice build styles.

While objects A and B include first and second build styles only, the configuration of the build styles can be varied, and the object can be formed by incorporating one or more boundary skins. For example, FIG. 4 illustrates another three dimensional object embodying the invention.

Object C includes first and second build style lattices 300, 304, and also includes a boundary skin 308 with which the first and second style lattices 300, 304 are integrally formed and which is supported by at least one, and preferably both, of the first and second build style lattices 300, 304. The boundary skin 308 of object C is relatively thin, but can be made as thin or thick as is desired for the particular geometry of the object C and the anticipated use of the object C. A typical wall thickness can be in the range of 0.010 inches to 0.55 inches.

Objects including intelaced first and second build style lattices can be configured to be entirely solid, partially solid and partially hollow, or almost entirely hollow. In particular, the first and second interlaced lattice build styles define therebetween an interface which, in some configurations, can include voids or spaces between the respective lattices or, in other configurations, can include the intersection of materials that are part of the lattices. Some intertwined lattice applications require a fine, minimal lattice volume with open communication throughout the lattice void space or interface. Other applications require a lattice interface wherein the voids defined by the lattices are interconnected and afford fluid flow in a controlled yet continuous manner. In other applications, the lattices are defined by structures having leg widths that are large relative to the spacing or offset between the lattice structures so that the legs of the lattice structures occupy the interface and form material that provide a substantially solid region of the object. In the extreme, the entire object can be a single piece of solid material provided by the lattice structures.

More particularly, in the object B shown in FIG. 3, the interface 312 is substantially hollow because the spacing between the first and second lattice build styles 200, 208 and the relative thickness of the legs and nodes of the respective build styles is such that the structural components of the build styles do not entirely occupy the object B. In this type of object, the interface 312 can be evacuated or occupied by a fluid. Also, as further explained below, in some applications for use of the object, the interface can be configured to define at least one channel for conducting a fluid along a predetermined path. In other applications, the fluid conducting channel can provide a cross-section which varies, e.g., widens to accept greater volumetric flows or narrows to define a capillary-like structure useful for slowing volumetric flow rates and/or carrying out mass transfer functions.

In other objects, for example object C, the interface is substantially solid because the spacing between the first and second lattice build styles and the relative thickness of the legs and nodes of the respective build styles is such that the structural components of the build styles intersect and entirely occupy the interior space of the object. In this type of object, the interface is occupied by a solid material and is defined by the transition between the materials used for the first lattice build style and the second lattice build style. In effect, the interface is occupied by the respective legs and nodes of the first and second build style lattices.

The nature of the interface of objects made with interlaced lattice build styles can vary in three dimensions and at different rates through the entire object so that any combination and/or variation of hollow and solid interfaces can be achieved. This can be established in a variety of ways, such as by increasing or decreasing the thickness of the legs of both lattices at equal rates. The legs and nodes of the build style lattices can also be made to be of independently varying thickness. For example, as shown in FIG. 3, in object A the legs 314 and nodes 316 of the first build style lattice can be made to be of one size or thickness and the second build style lattice 208 can be made to include interconnected legs 320 and nodes 322 having a substantially uniform thickness different from the thickness of the legs and nodes of first lattice.

One application for intertwined lattice build styles is for the fabrication of objects made of functionally gradient material. Functionally gradient materials essentially fuse two materials having different physical characteristics to form one hybrid material, and their use in structural components results in the possibility of forming a vast range of new engineering materials. Using the intertwined lattice structures, gradient materials can be produced to have varying properties within a single object or mechanical component so as to handle a spectrum of application requirements, without changing design geometry of the component. A component made of a functionally gradient material, i.e., made from a first material and a second material using intertwined lattice structures, provide a continuous, integrated component having regions that transition from one material to another through a series of interstitial layers. This interlaced, seamless transition of material properties is accomplished without distinctive, typically planar, seams or interfaces which are subject to stress concentrations and which are found with traditionally bonded materials.

Functionally gradient material components or three-dimensional objects made of functionally gradient material can be fabricated using additive SFF processed to build interlaced lattice build styles having regions which transform from one material to another in an integrated, predictable and predetermined manner. One technique that can be used to create functionally gradient material objects, the spacings between lattice build style units can be kept constant while the leg thickness is increased in a controlled manner. This controlled increase in branch thickness results in a proportional change in volume percentage of material combinations. At the extreme, the volumetric percentage of the respective materials used for the lattice build styles varies inversely from nearly 100% of a first material and nearly 0% of a second material to 100% of the second material and 0% of the first material, at any rate and in any direction with the gradient material object. By using interlaced lattice build styles made of respective materials to form such functionally gradient material objects, the transformation of the object can be three-dimensional and mechanically inter-linked.

As shown in FIG. 5, the object D illustrates an example of an object that can be made using interlaced lattice build styles to form a component having a functionally gradient material. The object has a first region 400 and a second region 404. The first region 400 of the object D has materials providing the first region with particular physical characteristic, and the second region has differing physical characteristics. These differences in physical characteristics are achieved by providing the object D with first and second build style lattices 408, 412 which each extend into the first region and into the second region. The thickness of the legs 416 of the first lattice 408 and the thickness of the legs 420 of the second lattice 412 vary from the first region 400 to the second region 404 to vary the amount of material respectively provided by each build style lattice 408, 412 to the respective regions of the object.

In the example illustrated by FIG. 5, the thickness of the legs 416 of the first build style lattice 408 and the thickness of the legs 420 of the second build style lattice 412 vary inversely from the first region 400 to the second region 404 so that the percentage of material provided by the first build style lattice 408 varies from an upper threshold percentage in the first region 400 to a minimum percentage in the second region 404. Conversely, the thickness of the legs 420 of the second build style lattice 412 vary to provide an upper threshold percentage in the second region 404 to a minimum percentage in the first region 400.

Other variations of the leg and node configurations are also possible with interlaced lattice build styles. For example, in object E shown in FIG. 6 (See, FIGS. 7, 8 and 9), the legs 500 and nodes 502 of either of the build style lattices can be made to be hollow and interconnected. More particularly, in the object E, the legs of the first build style lattice define respective bores 510 having an inner diameter. The inner bores can be either uniform along the length of the legs or the inner diameters of the bores can vary to form capillary like structures (see bores 512 and 514 in FIGS. 8 and 9).

Such structures having hollow legs and nodes are useful in a variety of applications. With the layer wise build method of SFF arises the opportunity to produce cooling and heating systems conformal to complex contoured surfaces, where heat exchange is critical. Applications such as injection molding, where a large percentage of cycle time is spent cooling, benefit significantly from conformal cooling channels. Interlaced lattice build styles can be used to make objects useful for conformal cooling and heating.

In this case an object, such as object E in FIG. 6, having interlaced lattice build styles to define a void adjacent a boundary skin 520 is formed and used so that the inter-lattice voids create the conformal fluid channels. Interconnections between the lattice voids are useful to conduct fluids along flow paths 524 in close proximity to the boundary skin. An example of a use or application of this type of object is a mold having a mold surface and cooling channel adjacent the mold surface. The usage of interlaced lattice build styles in such an application is particularly useful for molds requiring deep mold cavities or in molds having irregular contours on the mold surface. Also, the legs of the respective interlaced lattices extend across the voids and induce beneficial turbulence in the flow of fluids therethrough, consequently resulting in improved convective heat transfer within the object. In addition, to ensure even flow over a complex surface or variable heat removal at various locations, node size or depth of the interlaced lattice build styles can be adjusted throughout the object.

Objects made with interlaced lattice build styles also can be useful for mass transfer applications where entities, e.g., electrons, nutrients, etc., need to be moved efficiently from one object to another in a controlled manner. The basic concept with such transfer mechanisms is to intermesh interlaced lattice build styles to form two distinctly separate structures or materials separated by a thin wall. The two materials could be liquid/gas/solid or conductive/insulative or any of a wide variety of other possible combinations.

As one example, an object such as object E in FIG. 6, can be used as a heat exchanger wherein a thermally conductive wall separates two interlaced lattice build styles voids. The wall transfers heat from one interlaced lattice build styles void fluid to another. The Interlaced lattice build styles flow path is non-linear and induces beneficial turbulent flow.

Another similar application is the use of the object as a battery cell. In this application the wall separating the interlaced lattice build style channels is a liquid electrolyte, one interlaced lattice build styles is made of a solid material and serves as the anode, and the other interlaced lattice build styles is made of a solid material that serves as the cathode.

Listed below are other possible three dimensional objects including interlaced lattice build styles and useful for transfer or filtering systems:

dialysis (the wall is a semi-permeable membrane);

tissue engineering (the first interlaced lattice build style form the artery, the second interlaced lattice build style forms the vein, the wall become the cell growth zone as well as capillaries);

circuitry (the first lattice is conductive, the second lattice is conductive, and the interface is insulative);

filters/separation devices (the wall is a porous material);

sensing (one fluid senses events in the other fluid through the wall); and fuel cells.

Figure 10:
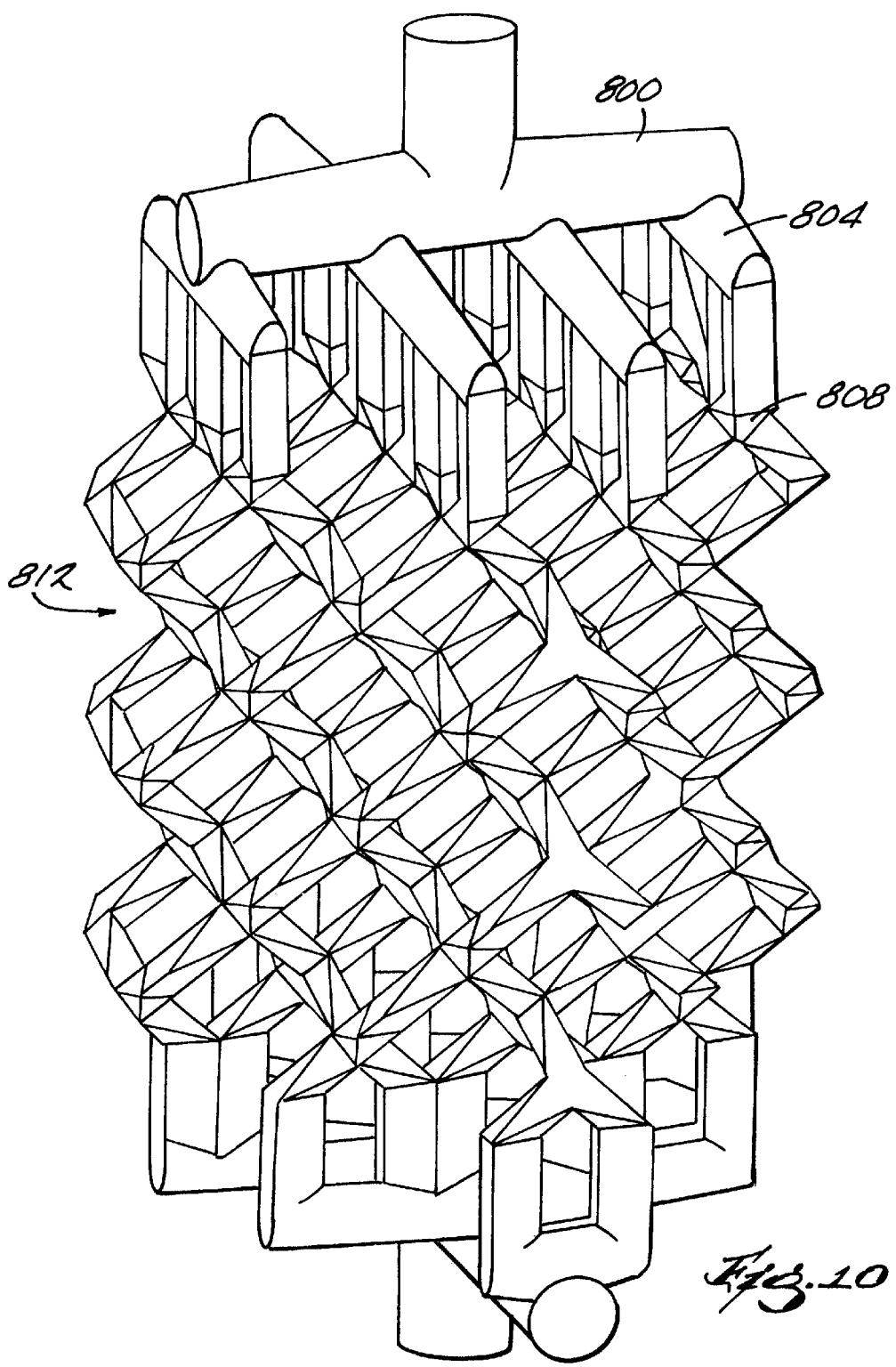
FIG. 10 illustrates a sixth three-dimensional object embodying the invention.

FIG. 10 illustrates an object F having a first lattice 800 providing a plurality of hollow legs and nodes, 804, 808 for conducting a fluid (not shown). The lattice 800 is thus useful for conducting a fluid such as air or oil. The ojbect F can be formed to include an open lattice portion 812 through which a medium such as air or a liquid or gas can pass, or can be made to include a second interlaced lattice (not shown) including either hollow or solid lattice members. The object F can be used for heat transfer functions by conducting fluids within heat-transfer relation.

Figure 11:
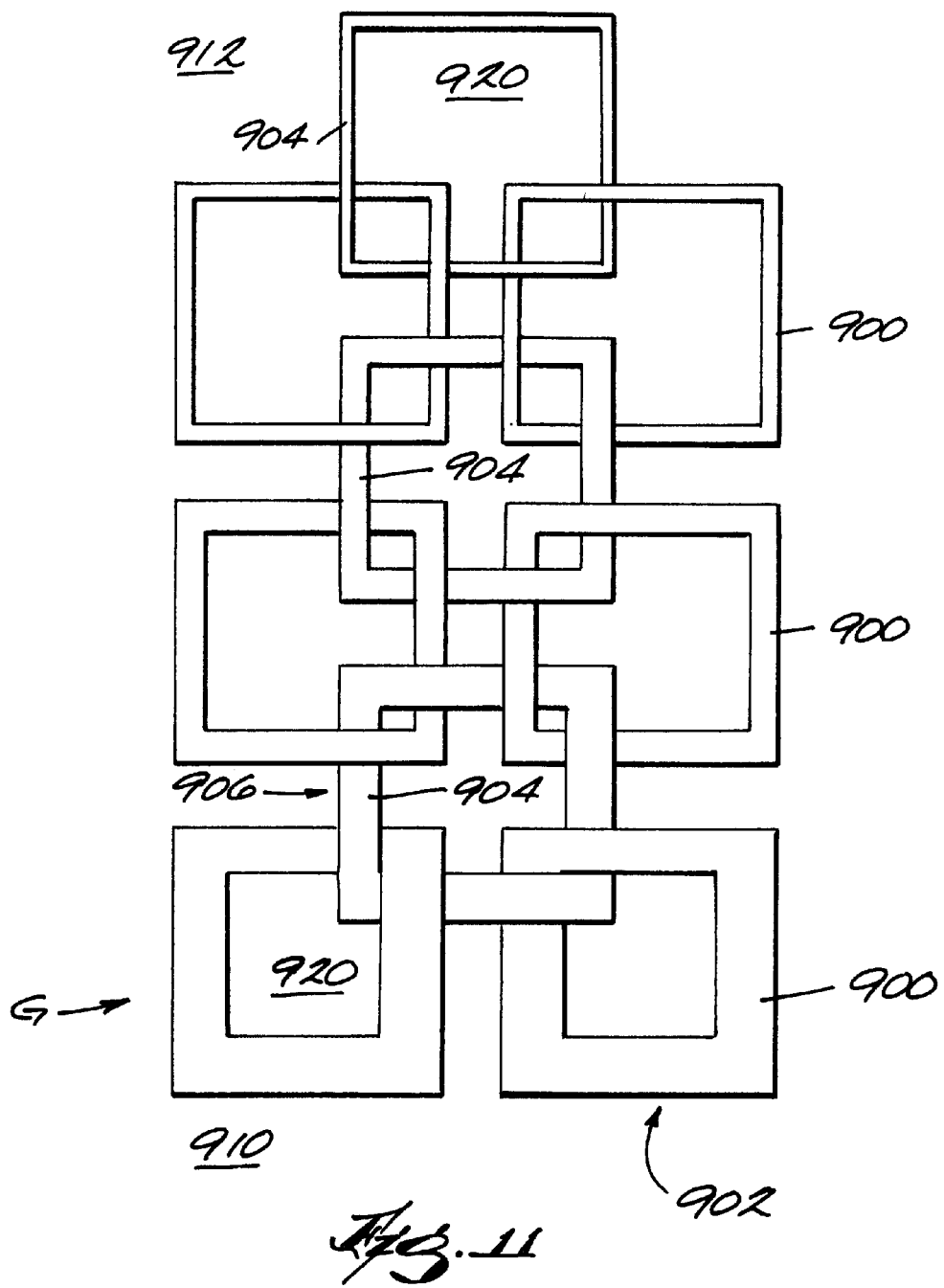
FIG. 11 illustrates a seventh three-dimensional object embodying the invention.

FIG. 11 illustrates another object G wherein the legs 900 of lattice 902 and the legs 904 of a second lattice 906 diminish in thickness as the lattices 902, 906 extend from one region 910 to a second region 912 of the object G. As a consequence, the volume of the interface 920 increases from region 910 to 920, thus forming relatively large fluid paths or open lattice structure in region 912 and narrower fluid paths or capillary-like structure in region 910.

The objects A, B, C, D, E, F and G a can be fabricated so as to have interlaced first and second build style lattices by use of the apparatus 10 through the following steps. First, the configuration of the object to be formed must be represented in digital form using the computer 14. Among the variety of ways a digital representation of the object can be provided is through use of the computer 14 and associated CAD/CAM software resident on the computer. A suitable CAD/CAM software application is sold under the name ProEngineer by Parametrics Technologies Corporation, and a suitable computer system to generate a digital representation of the object to be formed is sold under the name Indigo by Silicon Graphics. In the alternative, either the object itself or drawings of the object can be digitized to provide a digital representation of the object.

The next step in the fabrication method is generating a digital representation of the first build style lattice having a substantially uniform, build style structure 54. More particularly in this regard, and with particular reference to FIG. 4, the digital build style lattice includes a digital representation of the above described tetrahedron lattice 54. The generation of a digital representation of the lattice 54 is preferably performed through use of aforementioned ProEngineer software application in combination with software available from Materialize under the name Magics RP.

The method also includes the step of generating a digital representation of a second build style lattice having a structure similar to the first build style lattice. In those applications wherein the object being made includes a boundary skin, the step of generating a digital representation of the object includes generating a representation of a boundary skin. Similarly, in those applications using the tetra lattice build style or other like build style including, the step of generating a digital representation of the first build style lattice includes generating a representation of a plurality of legs and nodes.

The digital representations of the first and second lattices can be generated in a variety of ways, and as explained above, can incorporate legs having a variety of cross-sections and configurations suitable for the object desired and for the intended use of the object.

The next step in the fabrication method is overlaying the respective digital representations of the object and the first and second build style lattices. This step of overlaying the digital representations of the lattice 54 and object is preferably performed by use of the aforementioned Magics RP software. In order to provide a lattice structure including interlaced build style lattices, the overlaying step includes shifting the position of the second build style lattice relative to the first build style lattice to interlace the first and second build style lattices. The shifting or offsetting of the relationship of the first and second build style lattices will depend upon the desired configuration of the object, but generally will be in three dimensions so that the nodes of the second lattice build style are offset in the x, y and z axes from the nodes of the first build style lattice.

The next step in the fabrication method is intersecting the overlaid representations to generate a digital representation of the object incorporating the first and second build style lattices. The generation of a digital representation of the intersection of the representations of the lattice 54 and object is preferably performed through use of software available from 3D Systems, Inc. under the name Maestro using a double or triple border compensation with no fill.

The next step in the fabrication method is fabricating the digital representation of the object incorporating the build style by solid free form fabrication. This step can be accomplished through operation of apparatus 10 or any other suitable SFF apparatus.

In some applications it is desirable to provide different materials for the first and second build style interfaces. In order to fabricate such multi-material objects, the fabricating step can include providing a first material for the first lattice and a second material for the second lattice. The appropriate SSF techniques for fabricating multi-material objects are additive process of the type discussed above.

In those applications wherein the object being made includes a boundary skin, the fabricating step includes fabricating the boundary skin so that at least one of the first and second build style lattices supports the skin.

In those applications wherein the object being made is to include a lattice build style having hollow components, such as hollow legs for conducting a fluid, the step of generating a digital representation of the first build style includes the step of generating a digital representation of a third build style lattice, the overlaying step includes overlaying the digital representations of the first and third build styles and the intersecting step includes intersecting the digital representations of the first and third build styles to result in the representation of hollow legs in the first build style lattice. Also, in those applications wherein the object being made is to include a lattice build style having hollow components, the fabricating step includes fabricating at least one of the plurality of legs so as to be hollow.

Thus the three dimensional object can be formed through use of a free form fabrication method including the steps of:

1. generating a digital representation of the object including a representation of a surface of the object;
2. generating a digital representation of a first build style lattice having a predetermined, substantially uniform structure;

3. generating a digital representation of a second build style lattice having a structure similar to the first build style lattice;

4. intersecting the overlaid representations to generate a digital representation of the object incorporating the first and second build style lattices; and 5. fabricating the digital representation of the object incorporating the first and second build style lattices to form a boundary skin, a first lattice integrally formed with and extending from the skin and a second lattice interlaced with the first lattice and integrally formed with and extending from the skin.

Various features of the invention are set forth in the following claims.

What is claimed is:

1. A method for forming a three dimensional object, said method comprising the steps of:

generating a digital representation of the object;

generating a digital representation of a first build style lattice having a predetermined, substantially uniform structure;

generating a digital representation of a second build style lattice having a structure similar to the first build style lattice;

overlaying the respective representations of the object, the first build style lattice and the second build style lattice;

intersecting the overlaid representations to generate a digital representation of the object incorporating the first build style lattice and the second build style lattice; and fabricating the digital representation of the object.

2. The method set forth in claim 1 wherein the fabricating step includes providing a first material for the first lattice and a second material for the second lattice.

3. The method set forth in claim 1 wherein the overlaying step includes shifting the position of the second build style lattice relative to the first build style lattice to interlace the first and second build style lattices.

4. The method set forth in claim 1 wherein the first build style lattice includes a plurality of interconnected legs and nodes.

5. The method set forth in claim 4 wherein the legs of the first build style lattice have a substantially uniform thickness.

6. The method set forth in claim 4 wherein the second build style lattice includes a second plurality of interconnected legs and nodes having a substantially uniform thickness different from the thickness of the legs of first build style lattice.

7. The method set forth in claim 6 wherein the object has a first region and a second region, wherein said first and second build style lattices extend into the first region and the second region, and wherein the thickness of the legs of the first build style lattice and the thickness of the legs of the second build style lattice vary from the first region to the second region.

8. The method set forth in claim 7 wherein the thickness of the legs of the first build style lattice and the thickness of the legs of the second build style lattice vary inversely from the first region to the second region.

9. The method set forth in claim 1 wherein the first and second build style lattices are interlaced and define therebetween an interface.

10. The method set forth in claim 9 wherein the interface is substantially hollow.

11. The method set forth in claim 9 wherein the interface is occupied by a fluid.

12. The method set forth in claim 9 wherein the interface defines at least one channel for conducting a fluid along a predetermined path.

13. The method set forth in claim 9 wherein the interface is occupied by a solid material.

14. The method set forth in claim 9 wherein the interface is occupied by the legs of the first and second build style lattices.

15. The method set forth in claim 1 wherein the step of generating a digital representation of the object includes generating a representation of a boundary skin and wherein the fabricating step includes fabricating the boundary skin so that the first build style lattice supports the skin.

16. The method set forth in claim 15 wherein the fabricating step includes fabricating the boundary skin so that the second build style lattice supports the skin.

17. The method set forth in claim 4 wherein the legs of the first build style lattice are hollow and are interconnected.

18. The method set forth in claim 4 wherein the legs of the first build style lattice define respective bores having an inner diameter and wherein the inner diameters of the bores vary to form at least one capillary.

19. The method set forth in claim 1 wherein the step of generating a digital representation of the first build style lattice includes generating a representation of a plurality of legs and wherein the fabricating step includes fabricating at least one of the plurality of legs so as to be hollow.

20. The method set forth in claim 19 wherein the step of generating a digital representation of the first build style includes the step of generating a digital representation of a third build style lattice, the overlaying step includes overlaying the digital representations of the first and third build style lattices and the intersecting step includes intersecting the digital representations of the first and third build lattices styles to result in the representation of hollow legs in the first build style lattice.

* * * * *